United States Patent [19]

Mamiya et al.

[11] Patent Number: 5,724,323
[45] Date of Patent: Mar. 3, 1998

[54] RECORDING AND REPRODUCING APPARATUS FOR RECORDING MEDIA

[75] Inventors: Noboru Mamiya, Gifu; Takashi Tanifuji, Kyoto, both of Japan

[73] Assignee: Sanyo Electric Co., Ltd., Osaka, Japan

[21] Appl. No.: 615,844

[22] Filed: Jan. 29, 1996

[30] Foreign Application Priority Data

Jan. 30, 1995 [JP] Japan .................................. 7-034382
Jan. 30, 1995 [JP] Japan .................................. 7-034383

[51] Int. Cl.$^6$ .............................. G11B 17/22; G11B 3/90
[52] U.S. Cl. .................................. 369/32; 369/58
[58] Field of Search .............................. 369/30, 32, 33, 369/47, 48, 53, 54, 58

[56] References Cited

U.S. PATENT DOCUMENTS

| | | | |
|---|---|---|---|
| 5,392,265 | 2/1995 | Takezawa | 369/32 |
| 5,426,624 | 6/1995 | Goto | 369/32 |
| 5,598,391 | 1/1997 | Mukawa | 369/47 X |
| 5,613,112 | 3/1997 | Nagashima | 369/32 X |

OTHER PUBLICATIONS

T. Yoshida, "Mini Disc–New Audio Media" Sony Audio Develp Gp. (No English Translation).

Primary Examiner—Paul W. Huber
Attorney, Agent, or Firm—Loeb & Loeb LLP

[57] ABSTRACT

An apparatus for recording and reproducing data on a storage medium and a recording method for recording data in a storage medium. The recording of a new information item is permitted on the condition that the total number of slots managing the unrecorded parts and the recorded parts is smaller than the predetermined number of slots. The start and end addresses of the part to be erased are compared with the respective end and start addresses of the unrecorded parts; and, if there are any consecutive addresses, two parts are joined at a boundary between consecutive addresses. The joined parts set to correspond to one slot which includes the entire new unrecorded part. A memory area corresponding to addresses of the data storage area is allocated to a work memory. Small areas divided by respective start and end addresses of the recorded parts are extracted from the memory area. Then the memory area is provided with portions left by the extraction as unrecorded areas, and start and end addresses of the unrecorded parts are stored into empty slots.

7 Claims, 17 Drawing Sheets

Sector 0

Fig.5
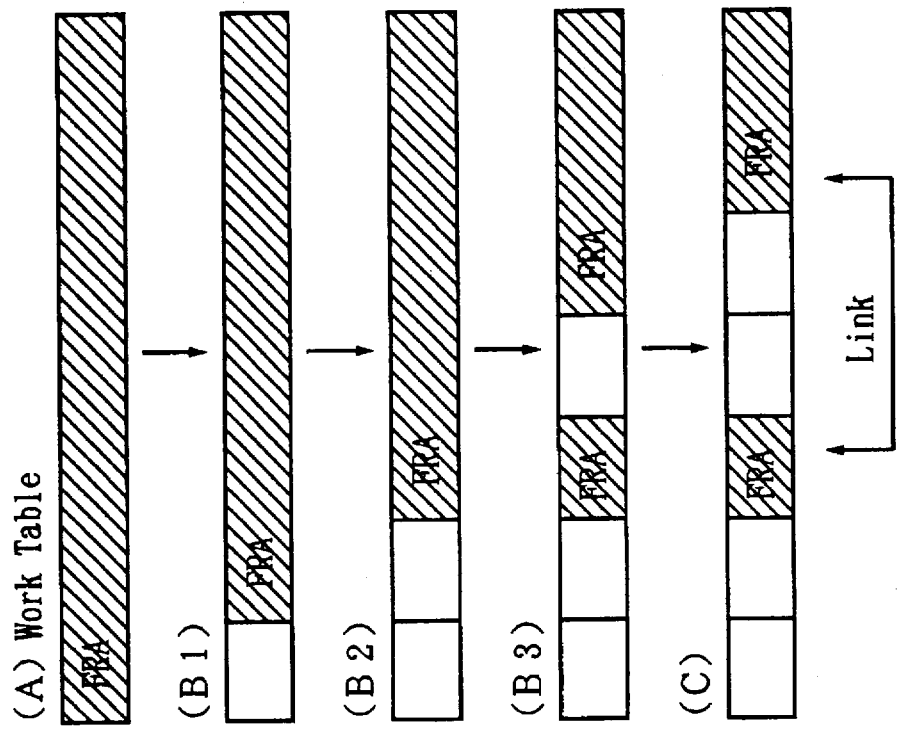
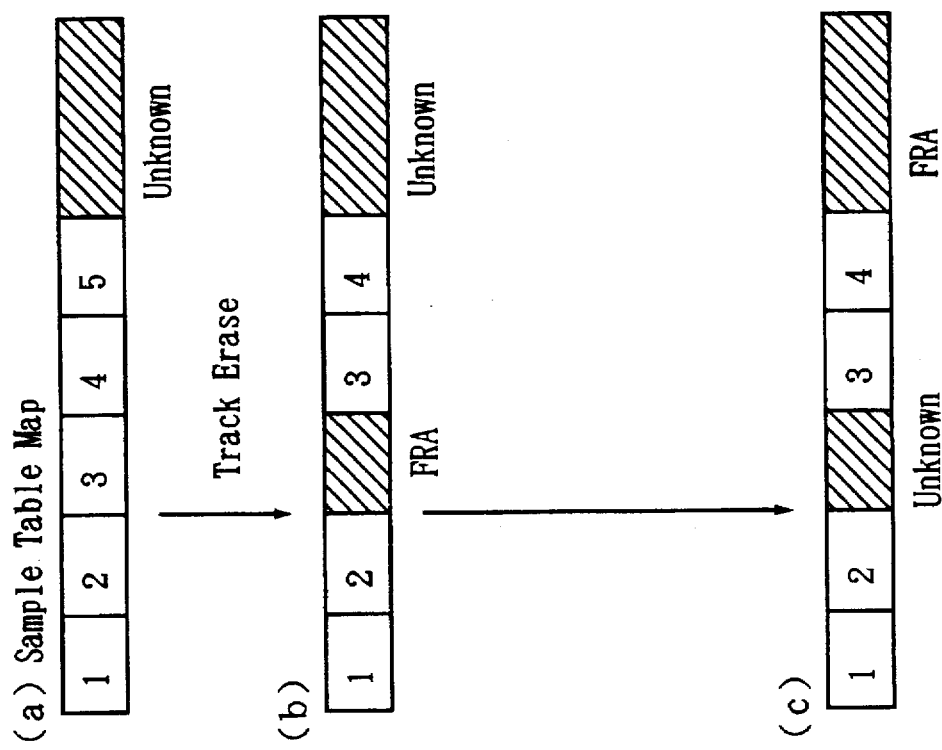

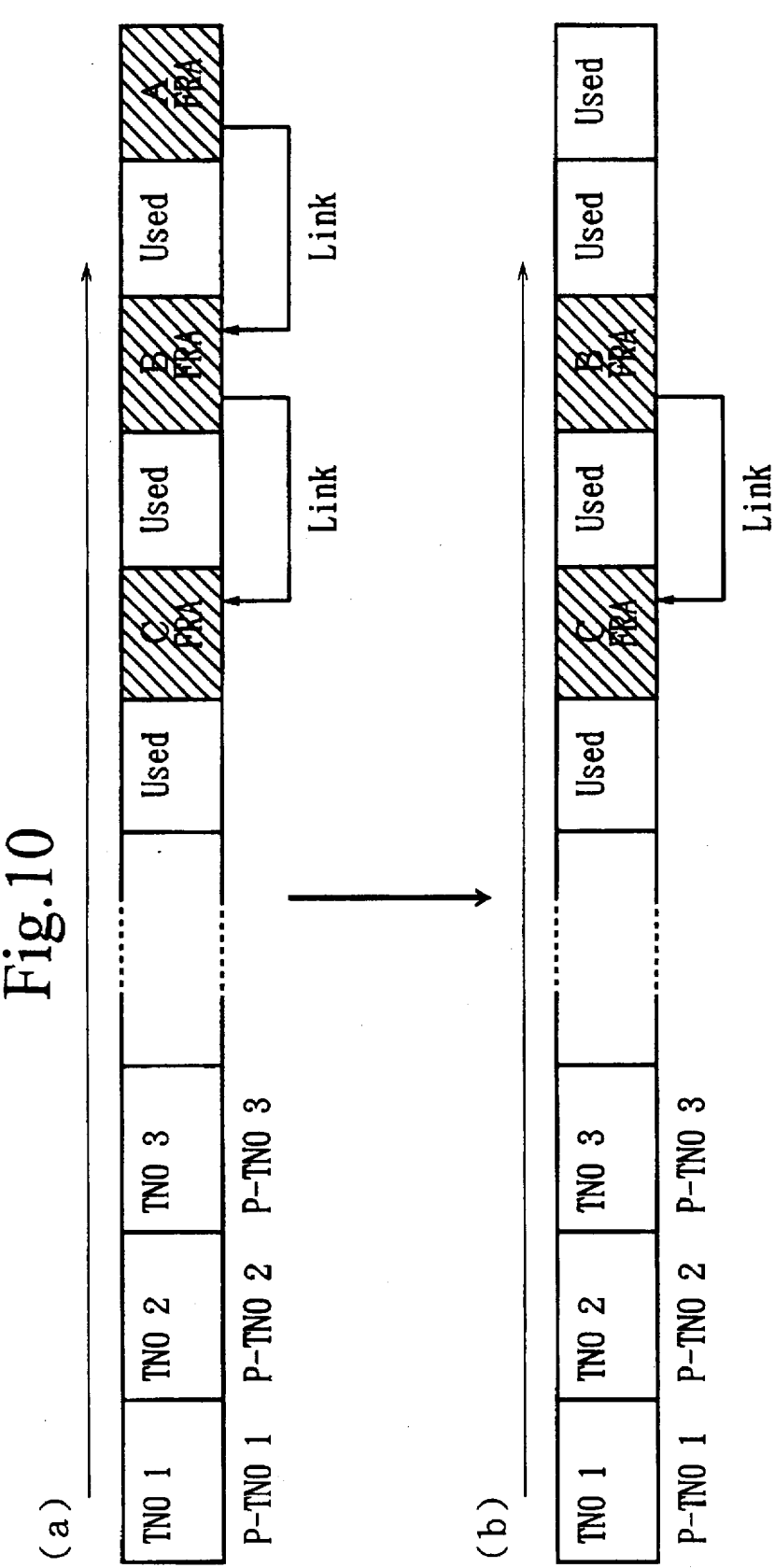

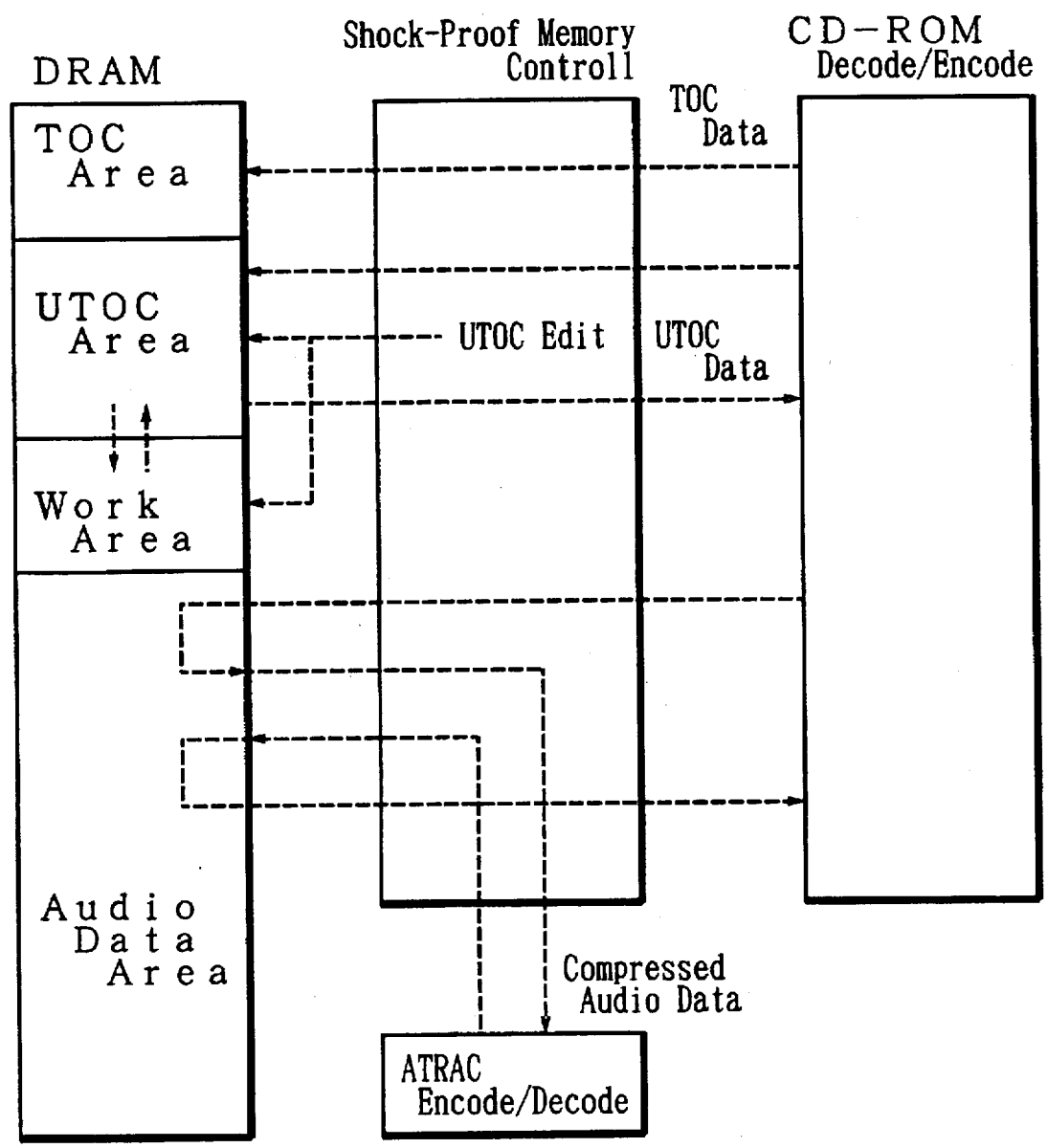

Fig.12

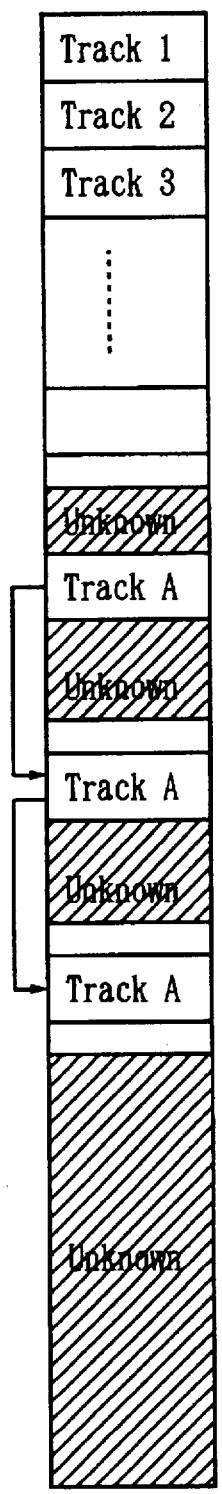

Track Image

| | |
|---|---|
| Track 1 | |
| Track 2 | |
| Track 3 | |
| ⋮ | |
| Unknown | F2 |
| Track A | A1 |
| Unknown | F3 |
| Track A | A2 |
| Unknown | F4 |
| Track A | A3 |
| Unknown | F1 |

Table Image

| | Start Address | End Address | Link-P | |
|---|---|---|---|---|
| Track 1 | Start Address | End Address | Link-P | |
| Track 2 | Start Address | End Address | Link-P | |
| Track 3 | Start Address | End Address | Link-P | |
| ⋮ | Start Address | End Address | Link-P | |
| | ⋮ | ⋮ | ⋮ | |
| ⋮ | Start Address | End Address | Link-P | |
| Track A | Start Address | End Address | Link-P | A1 |
| Track A | Start Address | End Address | Link-P | A2 |
| Track A | Start Address | End Address | Link-P | A3 |

Fig.13

Track Image

| Track 1 |
| Track 2 |
| Track 3 |
| ⋮ |
| |
| Unknown | F2
| Track A |
| Unknown | F3
| Track A |
| Unknown | F4
| Track A |
| Unknown | F1

Table Image

| | Start Address | End Address | Link-P |
|---|---|---|---|
| Track 1 | Start Address | End Address | Link-P |
| Track 2 | Start Address | End Address | Link-P |
| Track 3 | Start Address | End Address | Link-P |
| | Start Address | End Address | Link-P |
| ⋮ | ⋮ | ⋮ | ⋮ |
| | Start Address | End Address | Link-P |
| Free | Start Address | End Address | Link-P |
| Free | Start Address | End Address | Link-P |
| Free | Start Address | End Address | Link-P |

Fig.15

FRA Image

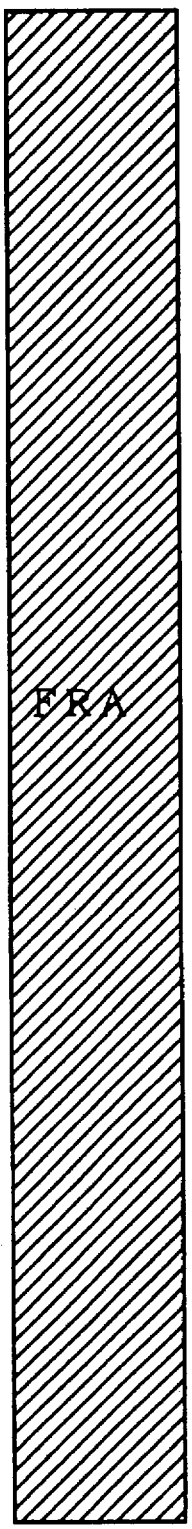

Work Table Image

| | | | |
|---|---|---|---|
| FRA | Start Address | End Address | Link-P |
| Free | Start Address | End Address | Link-P |
| Free | Start Address | End Address | Link-P |
| Free | Start Address | End Address | Link-P |
| Free | Start Address | End Address | Link-P |
| ⋮ | ⋮ | ⋮ | ⋮ |
| | Start Address | End Address | Link-P |
| Free | Start Address | End Address | Link-P |
| Free | Start Address | End Address | Link-P |
| Free | Start Address | End Address | Link-P |

Fig.16

FRA Image

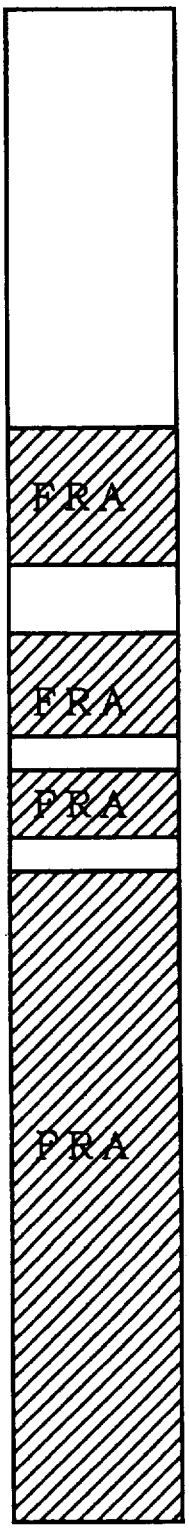

Work Table Image

| | Start Address | End Address | Link-P | |
|---|---|---|---|---|
| FRA | Start Address | End Address | Link-P | F1 |
| FRA | Start Address | End Address | Link-P | F2 |
| FRA | Start Address | End Address | Link-P | F3 |
| FRA | Start Address | End Address | Link-P | F4 |
| Free | Start Address | End Address | Link-P | |
| ⋮ | ⋮ | ⋮ | ⋮ | |
| | Start Address | End Address | Link-P | |
| Free | Start Address | End Address | Link-P | |
| Free | Start Address | End Address | Link-P | |
| Free | Start Address | End Address | Link-P | |

Fig.17

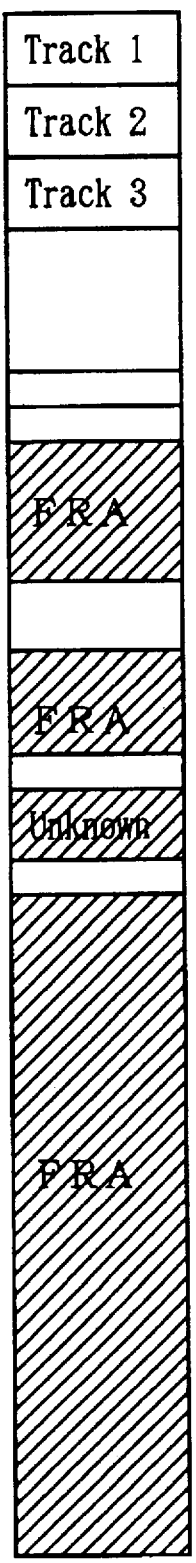

Track Image

Table Image

| | Start Address | End Address | Link-P | |
|---|---|---|---|---|
| Track 1 | Start Address | End Address | Link-P | |
| Track 2 | Start Address | End Address | Link-P | |
| Track 3 | Start Address | End Address | Link-P | |
| ⋮ | Start Address | End Address | Link-P | |
| | Start Address | End Address | Link-P | |
| | ⋮ | ⋮ | ⋮ | |
| | Start Address | End Address | Link-P | |
| FRA | Start Address | End Address | Link-P | F1 |
| FRA | Start Address | End Address | Link-P | F2 |
| FRA | Start Address | End Address | Link-P | F3 |

RECORDING AND REPRODUCING APPARATUS FOR RECORDING MEDIA

BACKGROUND OF THE INVENTION

1. Field of the Invention

The present invention generally relates to a recording and reproducing apparatus for use with recording media, including magnetooptical discs (e.g., MO, MD). More particularly, the present invention relates to a recording and reproducing apparatus for a recording medium having a User Table of Contents (UTOC) which is a management area, provided at the inner circumferential part of the discs with a predetermined number of slots and pointers for specifying the slots, for managing a plurality of parts that are divided and set up within a user data area of the recording medium.

2. Description of the Related Art

A recording and reproducing mini magnetooptical disc (MD) capable of recording music data for up to 74 minutes has been proposed in the industry. While the diameter of the MD is only 64 mm, the maximum recording time is 74 minutes, which is almost equivalent to the maximum recording time of a compact disc (CD) having a diameter of 120 mm. In the MD, music data is compressed by approximately ⅕ using a publicly known method, then modulated by an EFM method, and this modulated, compressed code is recorded.

As illustrated in FIG. 1, the recording area of the MD consists of a UTOC in which management data is recorded and a user data area in which music data is recorded. The UTOC area consists of 32 sectors in total from sectors 0 through 31. Various management data, illustrated in FIG. 2, are recorded in sector 0. In FIG. 2, sector 0 is dram as 4 bytes in the horizontal direction and extends to larger address values in the downward direction.

As illustrated in FIG. 2, sector 0 contains a byte designated First TNO in which the first track number is recorded and a byte designated Last TNO in which the last track number is recorded. The concept of a piece of music is expressed in terms of a track in the MD, and the concept of the track is expressed in terms of an information item in this specification. Also included in sector 0 are a table area designated as a Pointer Table and a table area designated as a Part Table.

As illustrated in FIG. 2, in the Pointer Table of sector 0 is a byte designated P-Empty in which the position of the head empty slot is recorded and a byte designated P-FRA in which the position of the head slot, among all the slots corresponding to the respective unrecorded parts, are recorded. Here, "part" means a small area set within the user data area when the music data is divided and recorded, and "slot" means a unit of the management of the addresses of the parts. Also, in the Pointer Table of sector 0 are 255 bytes of P-TNO1, P-TNO2, etc., to P-TNO255, in which the respective positions of the slots corresponding to the parts of the heads of the pieces of music have already been recorded are recorded, among all the slots corresponding to the parts in which the pieces of music have already been recorded. The total number of bytes of P-FRA and P-TNO1 through P-TNO255 is 256; and TNO stands for Track No.

Furthermore, as illustrated in FIG. 2, in the Part Table of sector 0 are 255 address management slots. In each slot, the start address and end address of the part managed by this slot and the data specifying the slot to be linked to this slot are recorded. Here, the data specifying the slot to be linked to this slot are recorded in a byte named Link-P. Thus, when one piece of music has been divided into a plurality of parts and then recorded, each slot managing each part is linked in order by the data of Link-P.

In FIG. 3, each part, and each pointer which indicates an address management slot managing the head part of a piece of music, among all of the address management slots managing respective parts, are correspondingly named P-TNO1 through P-TNO255. FIG. 3 illustrates a case where each piece of music has been recorded without being divided into a part, and the unrecorded parts, with a pointer which correspondingly indicates the position of the head slot, among all of the address management slots managing the unrecorded parts, by P-FRA. Also, FIG. 3 illustrates a case where there is only one unrecorded part at the end of the user data area.

Where 254 pieces of music have been recorded in an MD, as illustrated in FIG. 3(a), all the slots, or 255 address management slots, have been used. This means that 254 address management slots have been used for the parts in which the pieces of music have been recorded, and the one address management slot left has been used for the unrecorded part. Here, slots managing the recorded parts are indicated by P-TNO1 through P-TNO254, and the slot managing the unrecorded part is indicated by P-FRA. When a new piece of music is recorded, the slot that had been used for the unrecorded part is used for the part to which the new piece of music was added (i.e., as shown in FIG. 3). Then, the part to which the new piece of music was added is managed by the slot specified by P-TNO255. For this reason, there is not a slot available to the unrecorded part. As a result, the unrecorded part within the user data area is removed from the slot management, and the unrecorded part is inaccessible (i.e., the unrecorded part becomes "Unknown").

Next, when any one piece of music is erased, the slot managing the part in which this piece of music had been recorded becomes the slot for managing the unrecorded part. As shown in FIG. 3(b), although there is an inaccessible unrecorded part as described above, there is no slot for managing the unrecorded part. For this reason, the slot for managing the part from which the piece of music was erased becomes an address management slot specified by P-FRA, as illustrated in FIG. 3(c). FIG. 3(c) therefore illustrates an example of the piece of music recorded in the part that had been managed by the slot specified by P-TNO254 having been erased and becoming an unrecorded part. Thus, although one of the unrecorded parts is managed by the address management slot, this part is not related to the part removed from the management by the address management slots in FIG. 3(b). That is, in FIG. 3(b) the part removed from the management by the address management slot remains inaccessible. This arrangement results in there being an empty, unusable area within the user data area.

SUMMARY OF THE INVENTION

In view of the above, it is an object of the present invention to make the unrecorded part within the user data area accessible by the address management slots or by relating unrecorded parts to each other.

To achieve this object, according to an embodiment of the present invention, the recording of a new information item is permitted if the total of the number of slots managing the unrecorded parts and the number of slots managing the recorded parts is smaller than the total number of slots. Furthermore, according to embodiments of the present invention, the respective start addresses and end addresses of the parts to be erased are compared with the respective end addresses and start addresses of other unrecorded parts. As a result of this comparison, if there are any consecutive addresses, the two parts are joined at a portion in which the addresses consecutively occur, and the joined parts use one slot as a new unrecorded part.

Embodiments of the present invention will be described with reference to FIG. 4. In FIG. 4(a), the number of slots for managing the unrecorded parts is 1, and the number of slots for managing the recorded parts is 254. The total number of these slots is 255, which is equal to the total number of slots. Therefore, the recording of any additional information item is not permitted in FIG. 4(a).

When the part to be managed by the slot specified by P-TNO253 is selected as a part to be erased, the start address and end address of this part are compared with the respective end addresses and start addresses of the unrecorded parts. Here, "unrecorded parts" means both a part managed by the slot specified by P-FRA and parts managed by the slots to be linked to it by the data of Link-P. FIG. 4(b) illustrates a case where there are no consecutive addresses found in the comparison. In this case, the slot managing the part to be erased becomes a slot to be specified by P-FRA and the slot which was specified by the P-FRA becomes a slot to be linked to the newly-erased part by the data of Link-P.

Next, the part under management by the slot specified by P-TNO252 is newly-selected as a part to be erased, and the start address and end address of this part are compared with the respective end addresses and start addresses of the unrecorded parts. When consecutive addresses are found as a result of this comparison, these two parts are joined together at the consecutive boundary portion as illustrated in FIG. 4(c). FIG. 4(c) illustrates a case where the end address of the part newly selected as a part to be erased is consecutive to the start address of the previously erased part that had been managed by the slot which was specified by P-TNO253. The parts joined in this way correspond to a single slot representing one unrecorded part, and are managed by the single slot.

Another object of the present invention is to make the unrecorded part within the user data area manageable again and accessible even if the unrecorded part is removed from management by the address management slot.

To achieve this object, according to embodiments of the present invention, an area corresponding to the addresses for the user data area of the recording medium is secured within the memory. Then, the area within the memory is divided by the respective start addresses and end addresses of the parts in which an information item, such as a piece of music, has been recorded, and small areas formed within the area by this division are extracted from the area, one after another. Next, the respective start addresses and end addresses of each small area formed within the area remaining after the extraction are allocated to the empty slots as the respective start addresses and end addresses of the unrecorded parts.

In FIG. 5, the total number of address management slots has been reduced to 5, to simplify the description. However, it should be understood that a larger number of slots can be used. In FIG. 5(a), all the slots are used for managing recorded parts 1 through 5, and there are no slots available for managing the unrecorded part. Therefore, the unrecorded part is inaccessible. In FIG. 5(b), the recorded data of part 3 has been erased, and the slot that managed part 3 is now the head slot for managing all of the unrecorded parts (i.e., it is the slot specified P-FRA). Parts 4 and 5 are now managed as parts 3 and 4, respectively. At this point, the inaccessible part in FIG. 5(a) remains inaccessible.

Next, the area corresponding to the addresses of the user data area of the recording medium is allocated in the work memory of the apparatus as illustrated in FIG. 5(A). In the beginning, the whole area is treated as the unrecorded part FRA. Then, this area in the work memory is divided into small areas by the respective start addresses and end addresses of the recorded parts 1 through 4 and four small areas divided by the respective start addresses and end addresses of parts 1 through 4 are extracted. Specifically, the area is divided into the small areas illustrated in FIG. 5 (B1) through (B3) and (C), and the four small areas are extracted. As a result, two small areas corresponding to the unrecorded parts FRA are left in the work memory, and these two parts FRA are then linked, as shown in FIG. 5(C).

When a plurality of small areas corresponding to the unrecorded parts FRA are left within the work memory as described above, addresses for dividing these small areas left are allocated to empty management slots in a preset order, as the respective start addresses and end addresses of the unrecorded parts. Otherwise, as shown in FIGS. 5(a)–(c), when there are two small areas left when there is only one empty slot, then one of these two small areas will be inaccessible, as shown in FIG. 5(c). For this reason, a method in which a small area having a larger data volume is preferentially allocated is employed in which both slots are accessible, as shown in FIG. 5(C). Alternative embodiments may use an order of allocation that is fixed by another method.

BRIEF DESCRIPTION OF THE DRAWINGS

FIG. 5 illustrates by the method according to embodiments of the present invention for erasing the data of any part on the MD;

FIG. 10 illustrates the progress of slots in performing the processing illustrated in FIG. 8;

FIG. 11 illustrates another example of the functions of a portion of the apparatus illustrated in FIG. 6;

FIG. 12 illustrates the correspondence of the tracks of the user data area to the address management slots in the Parts Table on the MD;

FIG. 13 illustrates how the recorded data of track A in FIG. 12 has been erased;

FIG. 15 illustrates how the area corresponding to the addresses of the user data area of the MD has been secured within the work memory;

FIG. 16 illustrates how small areas divided by the respective start addresses and end addresses of the recorded parts illustrated in FIG. 15 have been extracted; and FIG. 17 illustrates how the table illustrated in FIG. 16 has been recorded in the Parts Table of the UTOC on the MD.

DESCRIPTION OF THE PREFERRED EMBODIMENT

Described below is an embodiment in which the present invention is applied in relation to an MD. However, alternative embodiments may be applied to other types of magnetooptical disks.

First Embodiment

Figure 6:
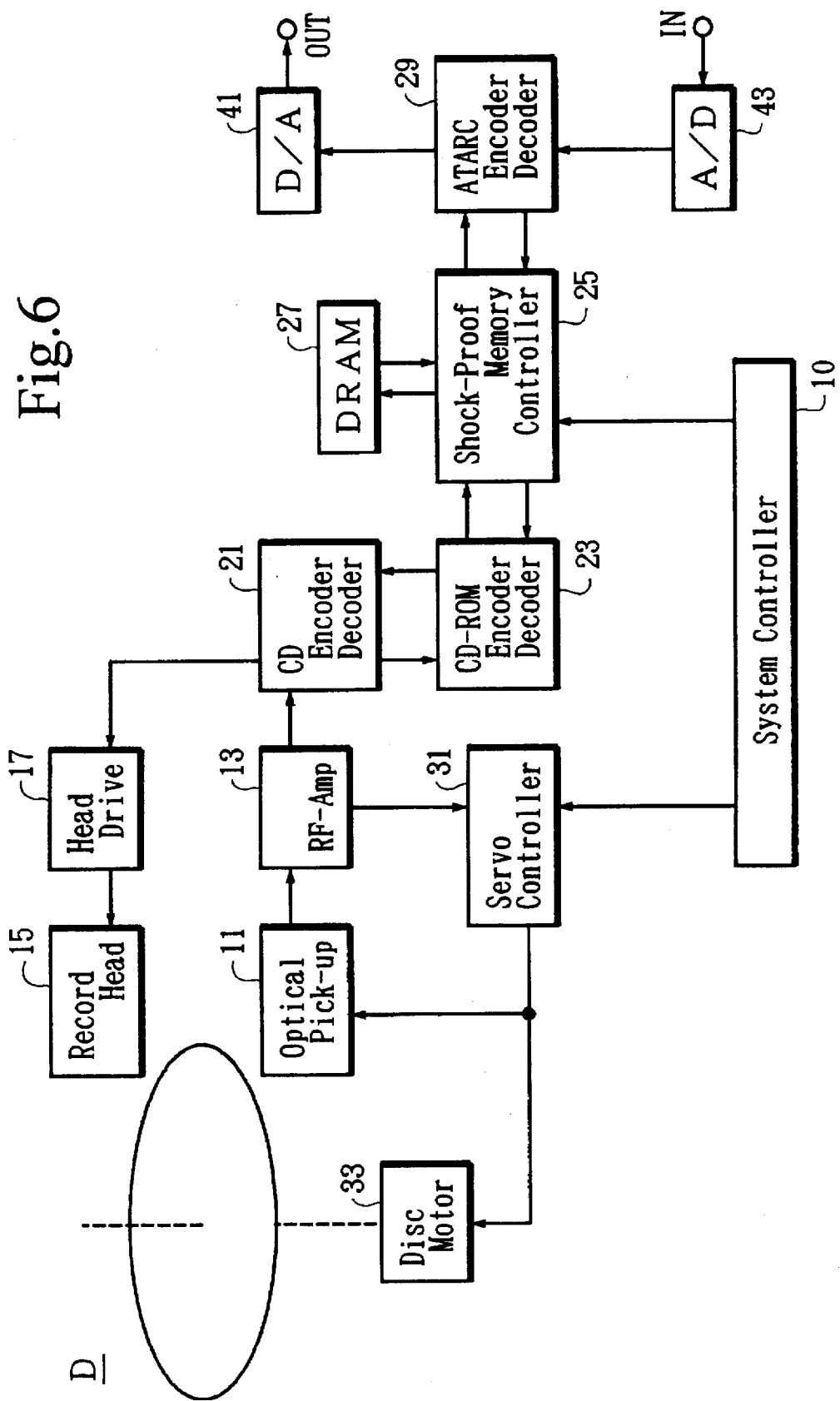
FIG. 6 is a block diagram illustrating the construction of a recording and reproducing apparatus for the MD according to an embodiment of the present invention.

Referring to FIG. 6, the processing for reproducing recording data in accordance with a first embodiment will be described. A recorded signal is read out of an MD D by an optical pickup 11 and is inputted into a CD decoder 21 through an RF amplifier 13. The EFM received signal is then demodulated by the CD decoder 21 and inputted into a CD-ROM decoder 23 where it is decoded into data in the CD format by the CD-ROM decoder 23. Next, the decoded data is stored in a DRAM 27 under the control of a shockproof memory controller 25. The data is read out of the DRAM 27 in the order of storage, which is under the control of the shockproof memory controller 25. The data read out of the DRAM 27 is then inputted into an ATRAC decoder 29 and uncompressed to approximately 5 times the recorded size by an ATRAC decoding method used by the ATRAC decoder 29 (i.e., ATRAC stands for "Adaptive Transform Acoustic Coding," and "ATRAC encoding method" means a method in which the audio data is compressed to approximately ⅕). The uncompressed data from the ATRAC decoder 29 is next sent to a D/A converter 41, converted to an analog audio signal by the D/A converter 41, and then outputted.

Next, referring to FIG. 6, the processing for recording will be described. An external analog audio signal is inputted and converted to digital data by an A/D converter 43, inputted into an ATRAC encoder 29, and then compressed to approximately ⅕ the size by the ATRAC encoder 29; i.e., the "ATRAC decoding method" means a method in which the compressed data is uncompressed to approximately 5 times the size into the audio data. The ATRAC encoding method is mainly characterized by raising the degree of the compression of sound which is less audible to human ears. The compressed data is stored into the DRAM 27 under the control of the shockproof memory controller 25, and then read out of the DRAM 27 in the order of storage, which is under the control of the shockproof memory controller 25. The data read out of the DRAM 27 is inputted into a CD-ROM encoder 23, encoded to data in the CD-ROM format by the CD-ROM encoder 23, then inputted into a CD encoder 21, which EFM modulates the data. A record head 15 and the optical pickup 11 are driven based on the EFM modulated signal to record the signal on the MD D.

Figure 1:
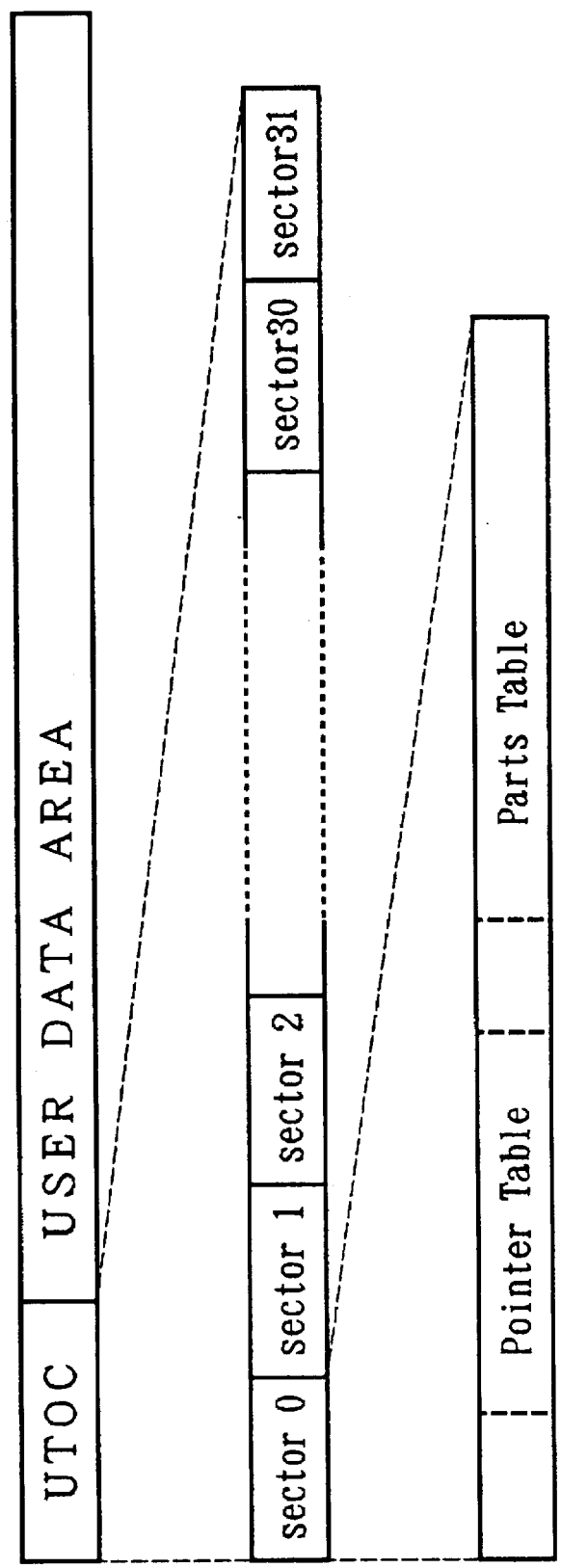
FIG. 1 illustrates the construction of a storage area on an MD.
Figure 2:
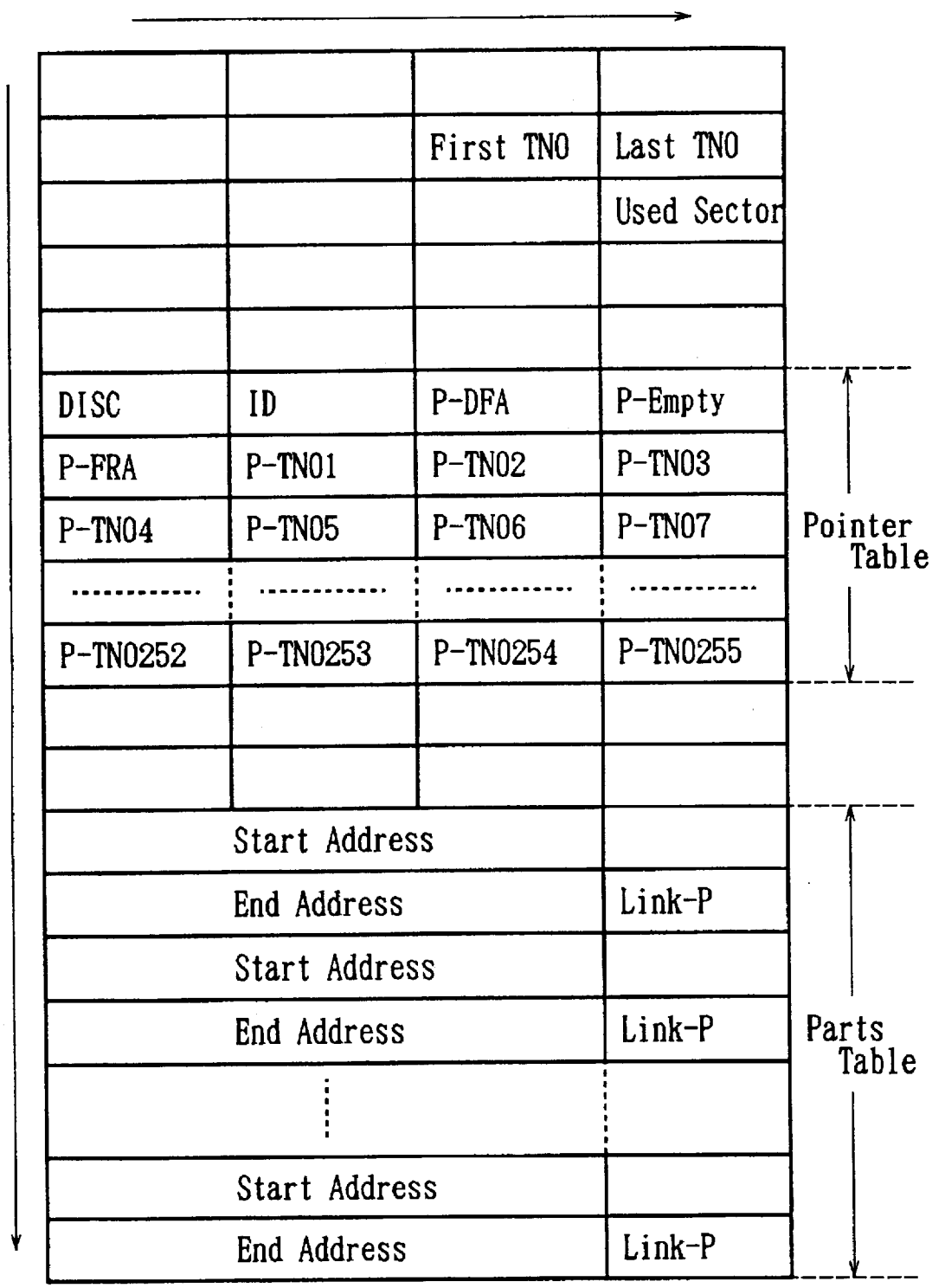
FIG. 2 illustrates the construction of sector 0 of the UTOC illustrated in FIG. 1.
Figure 3:
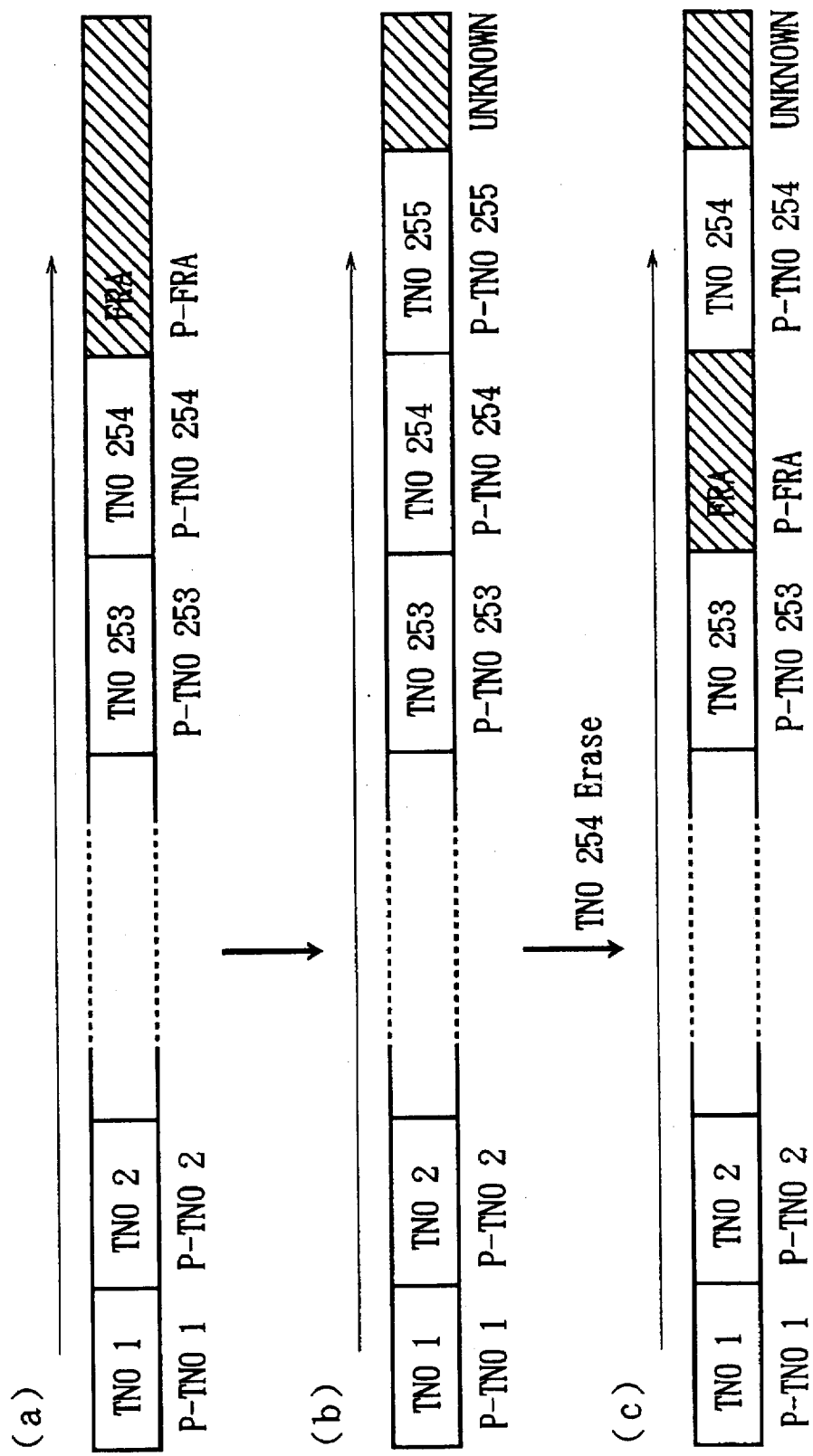
FIG. 3 illustrates a conventional method of erasing data of any part in correspondence with the pointers of a Pointer Table on the MD.
Figure 4:
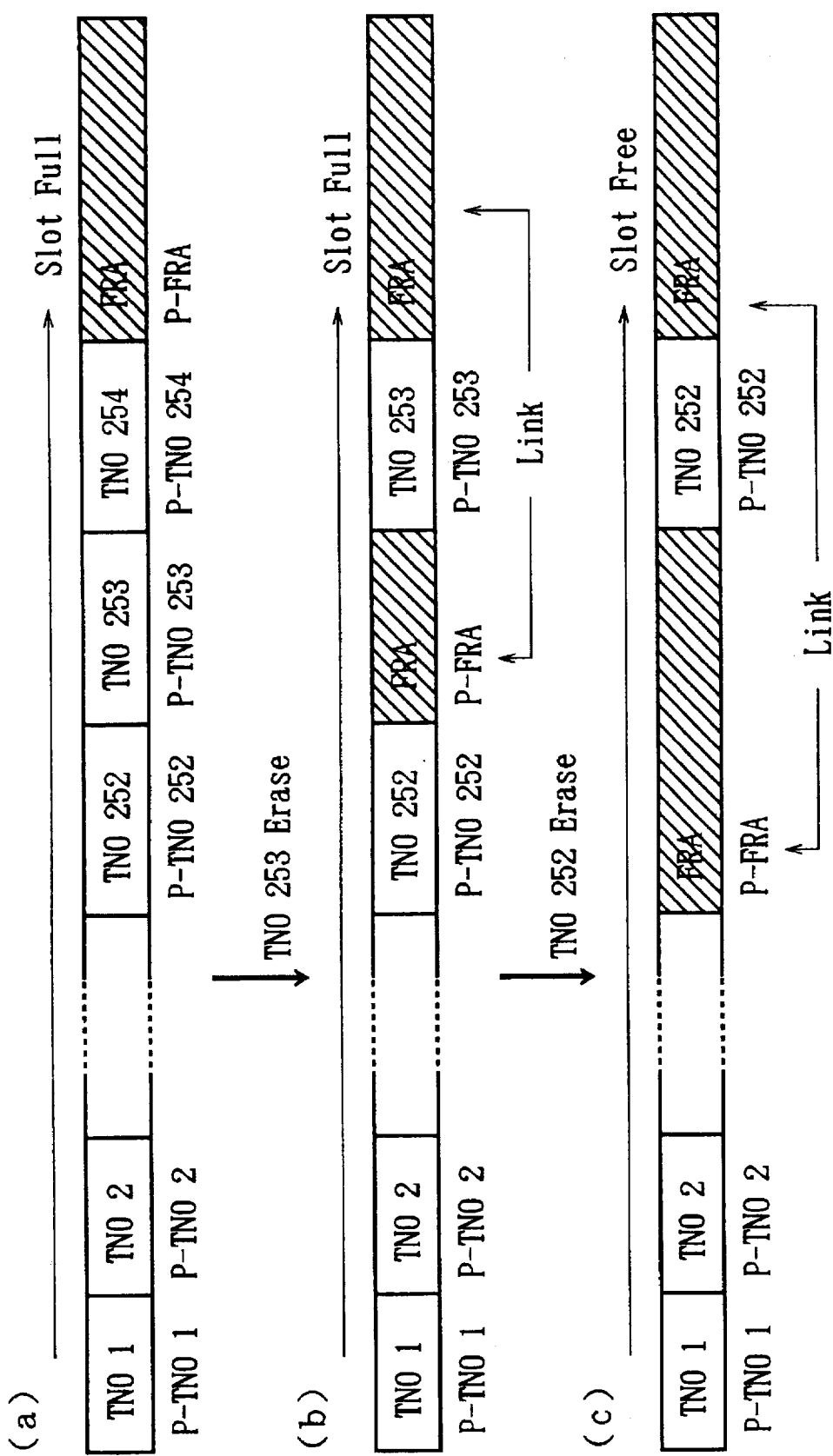
FIG. 4 illustrates a method according to embodiments of the present invention for erasing the data of any part in correspondence with the pointers of the Pointer Table on the MD.
Figure 7:
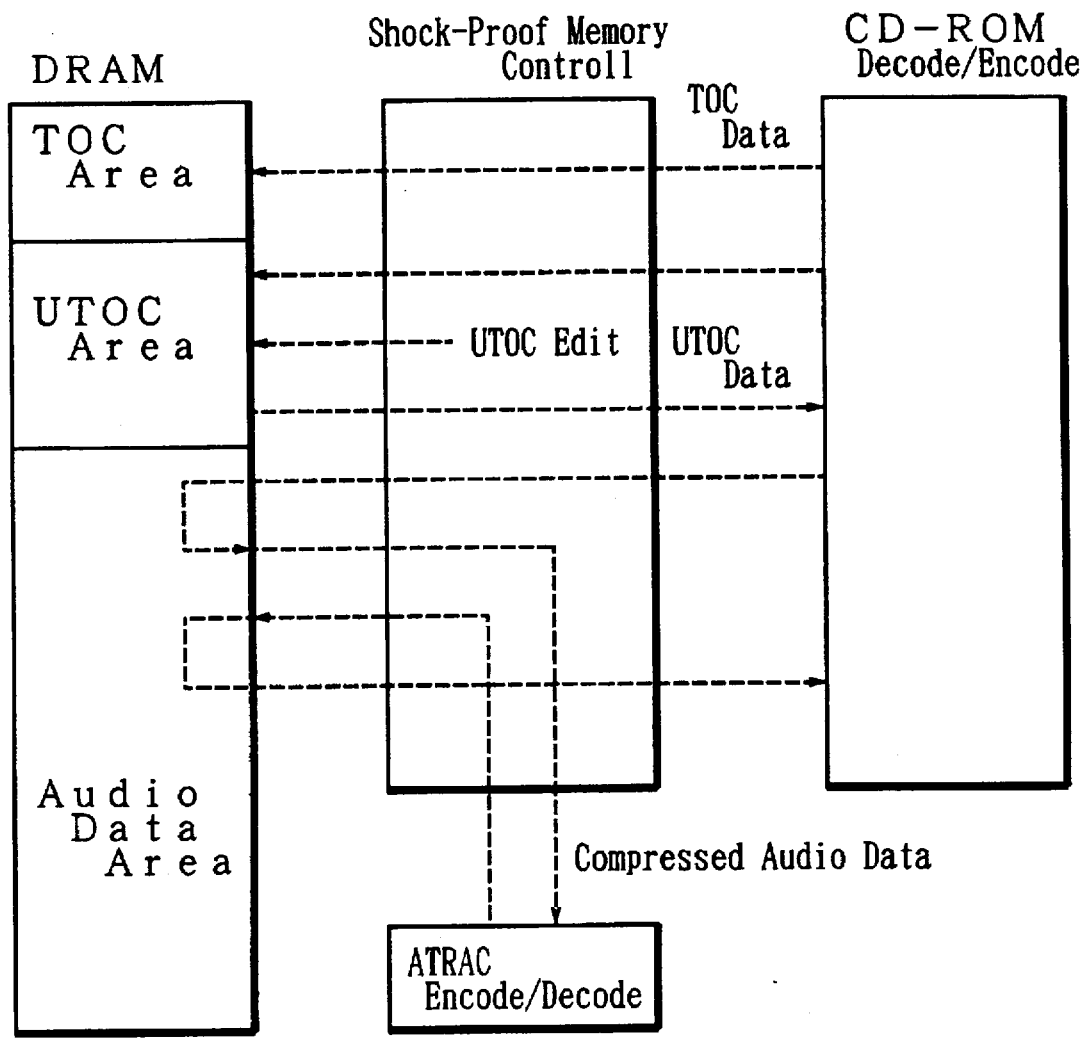
FIG. 7 illustrates an example of the functions of a portion of the apparatus illustrated in FIG. 6.

At the start of recording and at the start of reproduction, as illustrated in FIG. 7, the management information (not illustrated) of a TOC area at the inner circumferential portion of the MD D and the management information of the UTOC illustrated in FIGS. 1 and 2 are read out respectively, and then stored into a TOC area and a UTOC area, respectively, both of which are allocated within the DRAM 27.

Figure 8:
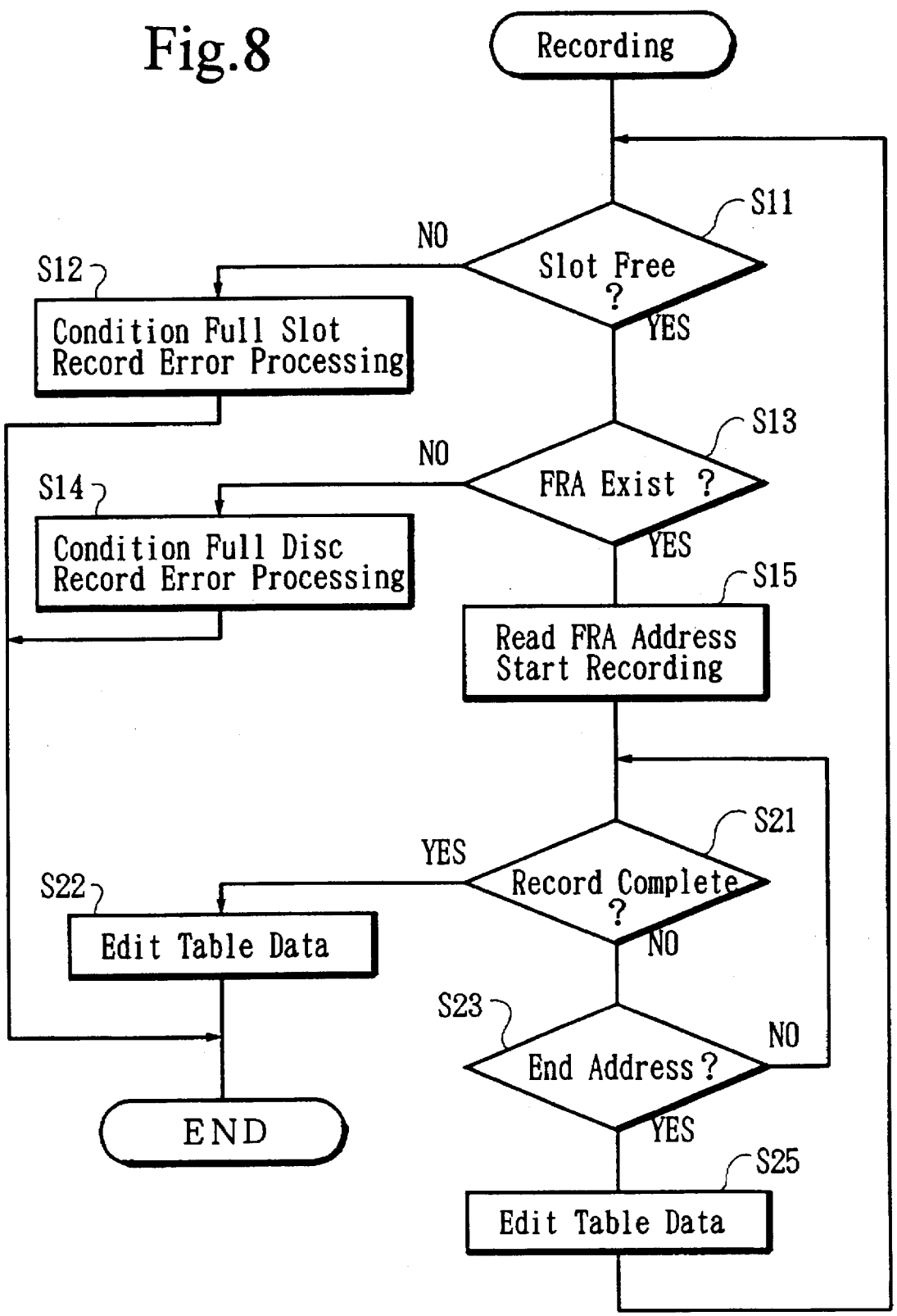
FIG. 8 is a flow chart illustrating processing related to the recording of the Parts Table of the MD by the apparatus illustrated in FIG. 6.
Figure 9:
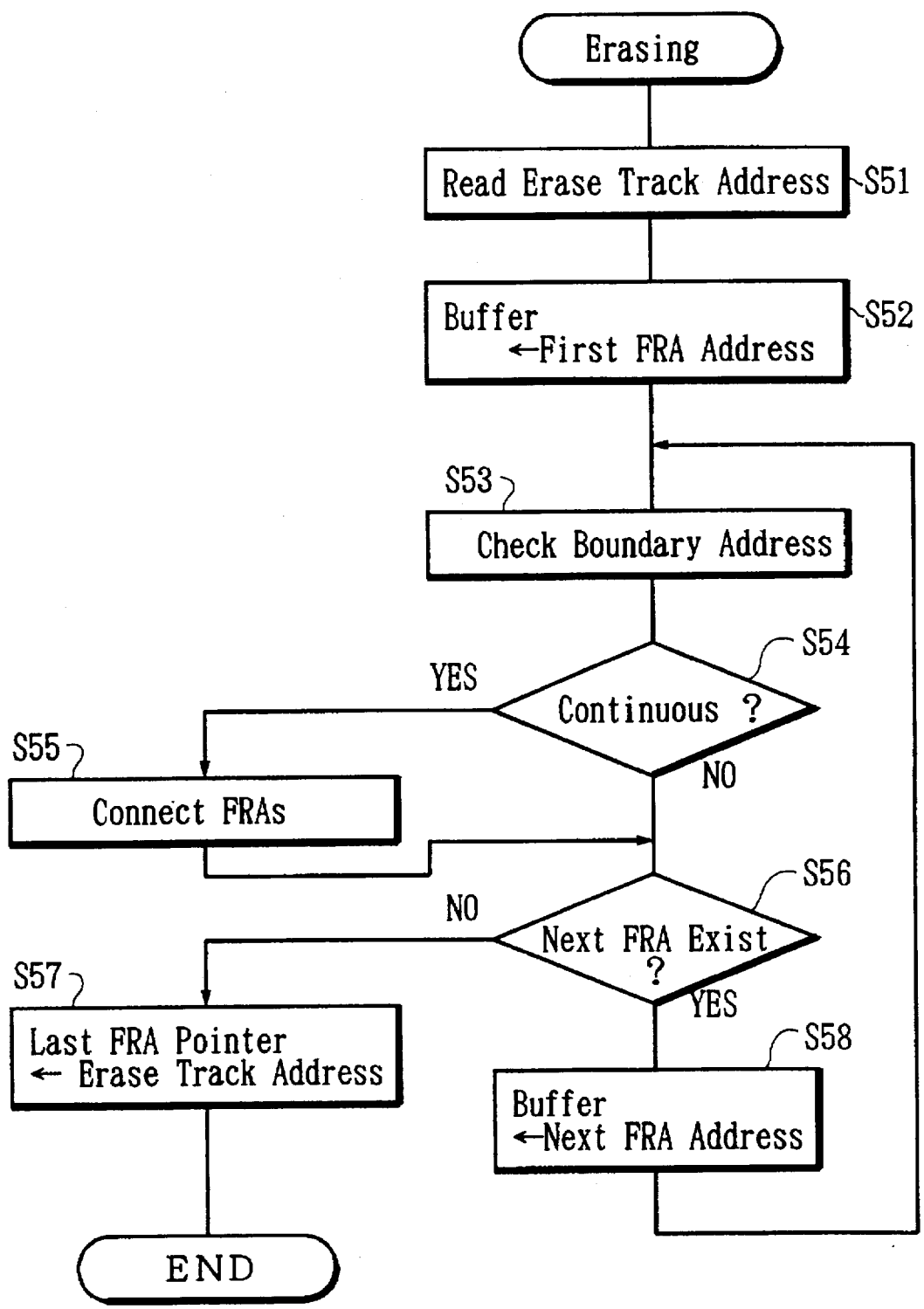
FIG. 9 is a flow chart illustrating processing related to the Parts Table of the MD by the apparatus illustrated in FIG. 6.

The processing illustrated in FIGS. 8 and 9 is performed in relation to the data stored in the DRAM 27 as described above in FIG. 7. At the end of data recording, management data which was updated by the processing illustrated in FIGS. 8 and 9 and was stored in the UTOC area within the DRAM 27 is recorded in the UTOC area on the MD D.

First, referring to FIG. 8, the recording processing will be described.

In the beginning, the availability of an empty slot is determined based on P-Empty in the Pointer Table (step S11). As a result, when there is no empty slot found (i.e., when P-Empty=0 (step S11 is NO)), a full slot error processing (step S12) is performed, and the processing illustrated in FIG. 8 terminates. Here, "full slot error processing" refers to a process to display the impossibility of recording, since the slots are fully occupied. Incidentally, in preferred embodiments "when there is no empty slot" the total number of slots managing the unrecorded parts (FRA parts) and the total number of slots managing the recorded parts is 255.

When there is at least one empty slot in step S11 (i.e., step S11 is YES), availability of the unrecorded part within the user data area is determined (step S13) (i.e., the availability of the slot managing the FRA part, which is an unrecorded part). As a result, when there is no unrecorded part found (i.e., when no slot managing the FRA part is found; i.e., step S13 is NO), a full disc error process (step S14) is performed, and the processing illustrated in FIG. 8 terminates. Here, "full disc error processing" refers to a process to display the impossibility of recording, since there is no empty area within the disc.

In the step S13, when there is at least one unrecorded part (i.e., an FRA part), the start address and end address recorded in the slot managing for the selected FRA part are read, and the recording of the signal from the start address of the selected FRA part begins (step S15).

Subsequently, when the signal has been recorded up to the end address of the FRA part (i.e., step S23 is YES), the table data of the slot managing the FRA part is edited (step S25). For example, as shown in FIG. 10, when step 25 is executed after a signal is recorded in an unrecorded part A (step S15), the position of the slot managing part A is written into the pointer "TNOX" ("X" denotes number) of the track number of the piece of music currently being recorded. Then, the following portion of the piece of music currently being recording is recorded into a part B which is an unrecorded part under management by the slot specified by the link pointer Link P of the slot managing part A (step S15).

When the signal has been recorded up to the end address of part B (i.e., step S23 is YES), the table data of the slot that is managing part B is edited (step S25). Here, although part B is a part that is to be linked to part A, as illustrated in FIG. 10, part B is not an unrecorded head part, and this processing is performed in step 25 so that the slot managing part B is linked to the slot managing part A.

On the other hand, when a signal commanding the termination of recording is detected during the signal recording (i.e., step S21 is YES), the end address stored in the slot managing part under recording is rewritten to the address for the termination of recording (step S22). Furthermore, the UTOC data of the MD D is updated by the data of the UTOC area in the DRAM 27 (step S22), and then the processing illustrated in FIG. 8 terminates.

Now, processing for erasing recorded data will be described with reference to FIG. 9.

In the beginning, the start address and end address of the piece of music to be erased are read (step S51). Specifically, when the piece of music to be erased is at X, the start address and end address recorded in the slot specified by the pointer P-TNOX are read (step S51). Then, the start address and end address recorded in the slot, which is specified by the pointer P-FRA, managing the head unrecorded part are stored in a buffer for comparison (step S52). Here, "slot managing the head FRA part" refers to a slot specified by the pointer P-FRA.

Next, the start address and end address read in step S51 are compared with the end address and start address stored in the buffer in step S52 (step S53). That is, the start address and end address of the part in which the piece of music to be erased has been recorded are compared with the end address and start address of the then head of the unrecorded part. As a result, when there are consecutive addresses found (i.e., step S54 is YES), these two parts are joined at the consecutive boundary portion between the start and end address of the respective part (step S55). For example, when the start address of the part in which the piece of music to be erased has been recorded continues to the end address of the then head unrecorded part, the head of the part in which the piece of music to be erased has been recorded is joined to the tail of the unrecorded part. Also, when the start address of the then head unrecorded part continues to the end address of the part in which the piece of music to be erased has been recorded, the head of the then unrecorded part is joined to the tail of the part of the piece of music to be erased. The part joined in this way is managed as a new continuous FRA part and managed by the slot specified by the pointer P-FRA.

On the other hand, in step S54, when there is no consecutive address (i.e., step S54 is NO), the availability of the slot managing the next unrecorded part is determined (step S56). Here, "slot managing the next unrecorded part" refers to a slot specified by the link pointer Link-P of the slot, which is specified by the pointer P-FRA, managing the first unrecorded part. As a result of the determination, when there is a slot managing the next unrecorded part (i.e., step S56 is YES), the start address and end address recorded in this slot are stored into the buffer for comparison in the same way as in step S52 (step S58). Then the start and end address of the next unrecorded part are compared with the end address and start address of the part in which the piece of music to be erased has been stored, in the same way as in step S53. Then, according to the result of this comparison, the same processing as described above is performed.

When the processing described above has been performed up to the last unrecorded part managed by the slots (i.e., step S56 is NO), processing is performed to link the slot managing the erased part to the other slots managing the last unrecorded part (step S57), and the processing illustrated in FIG. 9 terminates. That is, the position of the slot managing the head part of the track currently being erased is written into the link pointer Link-P of the slot managing the previously last unrecorded part. Alternatively, using the processing of step S57, processing for rearranging all the unrecorded parts in order from the inner circumferential side may be performed.

Second Embodiment

The construction of a recording and reproducing apparatus according to a second embodiment is similar to the construction of the first embodiment illustrated in FIG. 6. For this reason, the description of the recording and reproducing apparatus of the second embodiment will be omitted.

Figure 14:
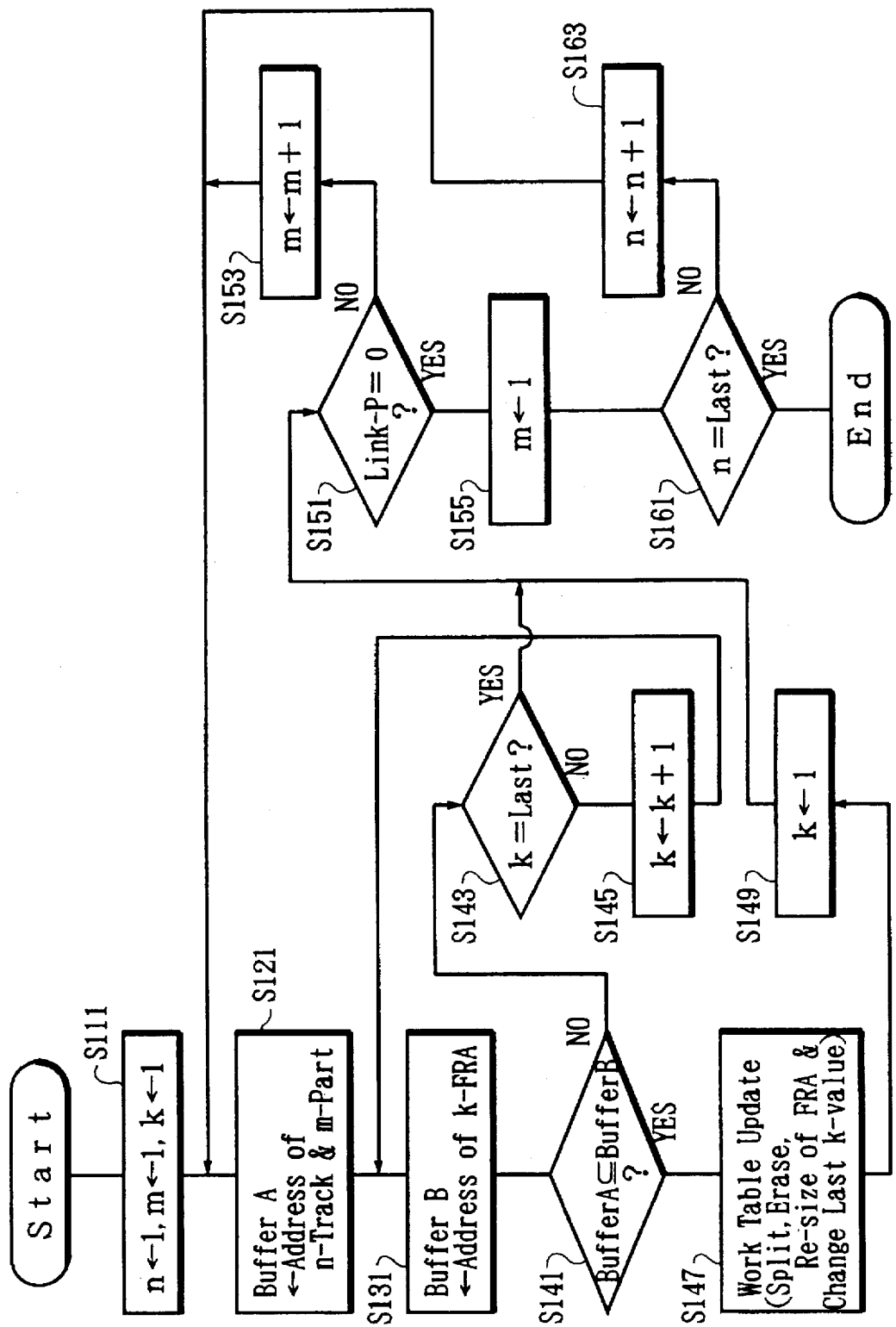
FIG. 14 is a flow chart illustrating the processing for making an unrecorded part within the user data area address on the MD manageable by a slot.

In the recording and reproducing apparatus according to the second embodiment, at the start of recording and at the start of reproduction, as illustrated in FIG. 11, the management information (not illustrated) of a TOC area at the inner circumferential portion of the MD D and the management information of the UTOC illustrated in FIGS. 1 and 2 are read out respectively, and then stored into the TOC area and the UTOC area within the DRAM 27, respectively. Furthermore, in recording and erasing, the processing illustrated in FIG. 14 is performed by using a work area allocated within the DRAM 27, and the data of the UTOC area is edited. Then, the edited result is written into the UTOC area on the MD D at any desired time, or otherwise at the end of recording.

According to FIG. 14, and referring to FIGS. 12, 13 and 15–17, processing for making the unrecorded part of the MD D manageable by a slot will be described. This processing includes resetting the unrecorded part that has been removed from management by the slot, and which is inaccessible, so that it is now accessible, again.

Consider, for example, there are four Unknown areas F1 through F4 which are inaccessible areas. Also consider that the piece of music A has been recorded in three divided parts, parts A1 through A3, and that parts A1 through A3 are linked in a descending order with the link pointer Link-P.

As illustrated in FIG. 13, when the entire piece of music A has been erased (i.e., the three parts A1 through A3 in which the piece of music A had been recorded), the addresses which were being managed by the respective slots are still subjected to address management by the slots of parts A1 through A3, even after erasure. That is, in this state, the respective parts A1 through A3 are still accessible as unrecorded parts (FRA). On the other hand, the areas F1 through F4 still remain as inaccessible parts (Unknown).

As illustrated in FIGS. 13 and 14, processing is performed. First, the variables n, m and k are set to 1 respectively (step S111), where n is a variable corresponding to the track number (e.g., a piece of music), m is a variable corresponding to the part number constructing the track (e.g., a piece of music), and k is a variable corresponding to the reconstructed unrecorded part number. The reconstructed unrecorded part is indicated as FRA in the left column of FIG. 16.

Second, the start address and end address of the mth part of the nth track (e.g., a piece of music) are stored in the buffer A (step S121). As n=1 and m=1 in the initial case, the addresses of the first part of the first track are stored.

Then, the start address and end address of the kth unrecorded part are stored in the buffer B (step S131). As k=1 in the initial case, the addresses of the first unrecorded part are stored. However, in the initial case, as illustrated in the left column in FIG. 15, the whole area is an unrecorded part. Therefore, the start address in this state is equivalent to the start address of the user data area on the MD D, and the end address is equivalent to the end address of the user data area on the MD D.

Next, it is determined whether the range divided by the start address and end address stored in the buffer A is included in the range divided by the start address and end address stored in the buffer B (step S141). During a first recording operation, it is determined whether the range divided by the start address and end address of the first part of the first track is included in the whole range of the user data area, which is the first unrecorded part (step S141). In the first recording operation, the determination will be YES, and the process proceeds to step S147.

In step S147, the table set in the work memory is updated. During the first recording operation, for example, the range from the start address to end address of the first part of the first track (e.g., a piece of music) is extracted from the unrecorded part FRA which in this case is equivalent to the whole user data area on the MD D. As a result, the FRA is divided into two areas excluding the range from the start address to end address of the first part of the first track (piece of music), and each area produced by the division is taken as unrecorded part FRA (i.e., reconstructed as an unrecorded part manageable by the slot). Along with this, the last value of k is altered to 2. Then, 1 is substituted for k (step S149). Next, it is determined in step S151 whether Link-P is 0, in other words, whether the part which had been compared in step S141 is the final part of the first track. As a result, when the compared part is not the final part (i.e., S151 is NO), the part number m is incremented (step S153), and the processing from step S121 described above is performed for the part number m after the previous increment value of m. That is, by extracting the small area divided by the start address and end address of the part next to the same first track (e.g., a piece of music) from the unrecorded part FRA, in which such small area is included, processing for dividing the unrecorded parts FRA into two for reconstruction is performed. Here, the unrecorded part FRA in which the small area described above is included can be retrieved by continuously making the determination of step S141 from the first unrecorded part FRA. The steps of this processing are indicated as steps S131, S141, S143, S145 and S131.

When the processing for extracting the respective parts of the first track (e.g., a piece of music) from the reconstructed unrecorded parts FRA in which these parts are included has been performed, and the processing for all the parts of the first track (e.g., a piece of music) has been completed, the determination of step S151 becomes YES, and the process proceeds to step S155. In step S155, the variable m is returned to the initial value of 1. Then, the process proceeds to step S161 where it is determined whether the track number n is the final number (step S161). When the processing for all parts of the first track (e.g., a piece of music) has been completed, and the process has proceeded to step S161, the track number n is 1 and it is not the final number n (as illustrated in FIG. 13), so the process proceeds to step S163, and the variable n is incremented. As a result, the same processing described above is performed for the next track number n. That is, by extracting the respective parts of the next track from the unrecorded parts FRA in which these respective parts are included, the processing for dividing the FRA into two parts for reconstruction is continuously performed for all parts of the next track.

When this processing is repetitively performed until the last part of the last track (e.g., a piece of music) (i.e., step S161 is YES), the processing terminates. This state is illustrated in FIG. 16. FIG. 16 illustrates the areas allocated to the DRAM 27, where the address of each unrecorded part is known.

The four unrecorded parts illustrated in FIG. 16 (i.e., four unrecorded parts whose addresses are known) are allocated to empty slots in the preset order. Here, "empty slot" refers to a slot which is not managing the address of a recorded part. As illustrated in FIG. 13, the data of the three parts A1 through A3 have been erased in this example, and the number of empty slots for managing unrecorded parts FRA is 3. To these 3 empty slots are allocated the 4 empty areas described above. Although there are various rules applicable to how the allocation is performed here in this embodiment, the outermost circumferential empty area is taken as the first, and the allocation is made in order from the inner circumferential side of the disc, as illustrated in FIG. 17. The allocation, however, should not be limited to this rule but may also be arranged so that larger empty areas are preferentially allocated to slots. In this way, according to this example, although the inaccessible areas are large in the initial case with F1 through F4, by applying the present invention as illustrated in FIG. 17, the inaccessible area can be reduced to only F4, since there are only 3 slots available.

We claim:

1. An apparatus for recording and reproducing data into and from a storage medium, wherein the storage medium has a data area, a parts table, and a pointer table, wherein the data area has a plurality of unrecorded parts and a plurality of recorded parts, wherein the parts table has a predetermined number of slots for storing part address data and linking address data of each of the unrecorded parts and the recorded parts, and wherein the pointer table has a capacity for a predetermined number of pointers, containing a first pointer and a plurality of second pointers, the first pointer pointing to a slot storing first part address data of the unrecorded parts, and the second pointers each pointing to another slot storing first part address data of the recorded parts, the apparatus comprising:

determining means for determining whether or not a total number of slots storing the part address data for both the plurality of unrecorded parts and the plurality of recorded parts is smaller than the predetermined number of slots;

recording means for recording an item of information into one of the plurality of unrecorded parts when the total number of slots storing the part address data is smaller than the predetermined number of slots;

slot writing means for writing part address data of the one part into which the item of information is recorded into a single slot from the predetermined number of slots, which is free of storing address data; and pointer writing means for writing a second pointer pointing the single slot into the pointer table.

2. An apparatus for recording and reproducing data on a storage medium having a rewrite enable table of contents that includes a predetermined number of pointers and a predetermined number of slots, each of the pointers pointing to either a slot which manages an unrecorded part allocated within a data storage area in the storage medium or one of the predetermined number of slots which manages a recorded part allocated within the data storage area, each of the predetermined number of slots storing start and end addresses of a corresponding part for managing the part, and each slot being stored at a position next to a slot managing a next part which is linked to a previous part, the recording and reproducing apparatus comprising:

determining means for determining whether a total number of slots for both the slot which manages an unrecorded part and slots of the predetermined number of slots which manage respective recorded parts is larger than the predetermined number of slots;

recording means for recording an item of information into a part set in the data storage area when the total number slots is smaller than the predetermined number of slots;

slot writing means for storing start and end addresses of a part in which the item of information is recorded into an empty slot from the predetermined number of slots to form a managing slot; and pointer writing means for storing a position of the managing slot in which the start and end addresses are stored.

3. An apparatus for recording and reproducing data on a storage medium having a rewrite enable table of contents that includes a predetermined number of pointers and a predetermined number of slots, each of the pointers pointing to either a slot which manages an unrecorded part allocated within a data storage area in the storage medium or one of the predetermined number of slots which manages a recorded part allocated within the data storage area, each of the predetermined number of slots storing start and end addresses of a corresponding part for managing the part and each slot being stored at a position next to a slot managing a next part which is linked to a previous part, the recording and reproducing apparatus comprising:

determining means for determining whether a total number of slots for both the slot which manages an unrecorded part and slots of the predetermined number of slots which manage respective recorded parts is larger than the predetermined number of slots;

recording means for recording a divided item of information across plural parts set in the data storage area respectively when the total number of slots is smaller than the predetermined number of slots;

slot writing means for storing start and end addresses of respective parts in which the divided item of information are recorded into empty slots to form managing slots; and pointer writing means for storing positions of the managing slots in which the start and end addresses are stored, the start address being either a head address among of all the unrecorded parts or a head address among of all the recorded parts in which the same divided item of information is recorded.

4. An apparatus for recording and reproducing data on a storage medium having a rewrite enable table of contents that include a predetermined number of pointers and a predetermined number of slots, each of the pointers pointing to either a slot which manages an unrecorded part allocated within a data storage area in the storage medium or one of the predetermined number of slots which manages a recorded part allocated within the data storage area, each of the predetermined number of slots storing start and end addresses of a corresponding part for managing the part and each slot stored at a position next to a slot managing a next part which is linked to a previous part, the recording and reproducing apparatus comprising:

retrieving means for retrieving consecutive addresses by comparing start and end addresses of a recorded part containing data which is commanded to be erased with respective end and start addresses of the unrecorded parts;

joining means for joining two parts at a boundary between the recorded part to be erased and any unrecorded part to form a new unrecorded part, one part to be joined being commanded to erase the recorded data, the other part to be joined containing one of retrieved consecutive addresses;

slot writing means for storing start and end addresses of the new unrecorded part into one of the two slots which had managed the two parts; and linking means for storing a position of a slot having the start and end addresses of the new unrecorded part into a previous slot which managed an unrecorded part.

5. An apparatus for recording and reproducing data on a storage medium having a rewrite enable table of contents that includes a predetermined number of pointers and a predetermined number of slots, each of the pointers pointing to either a slot which manages an unrecorded part allocated within the data storage area in the storage medium or one of the predetermined number of slots which manages a recorded part allocated within the data storage area, each of the predetermined number of slots storing start and end addresses of a corresponding part for managing the part and each slot stored at a position next to a slot managing a next part which is linked to a previous part, the recording and reproducing apparatus comprising:

determining means for determining whether a total number of both the slot which manages an unrecorded part and slots of the predetermined number of slots which manage respective recorded parts is larger than the predetermined number of slots;

recording means for recording an item of information into a part set in the data storage area when the total number of slots is smaller than the predetermined number of slots;

retrieving means for retrieving consecutive addresses by comparing start and end addresses of a recorded part containing data which is commanded to be erased with respective end and start addresses of the unrecorded parts;

joining means for joining two parts at a boundary between the recorded part to be erased and any unrecorded part to form a new unrecorded part, one part to be joined being commanded to erase the recorded data, the other part to be joined containing one of retrieved consecutive addresses;

slot writing means for storing start and end addresses of the new unrecorded part into one of the two slots which had managed the two parts and for storing start and end addresses of a part in which the item of information is recorded into an empty slot;

linking means for storing a position of a slot having the start and end addresses of the new unrecorded part into a previous slot which managed an unrecorded part; and pointer writing means for storing a position of the slot in which the start and end addresses are stored.

6. A recording method for recording data on a storage medium having a rewrite enable table of contents that includes a predetermined number of pointers and a predetermined number of slots, each of the pointers pointing to either a slot which manages an unrecorded part allocated within a data storage area in the storage medium or one of the predetermined number of slots which manages a recorded part allocated within the data storage area, each of the predetermined number of slots storing start and end addresses of a corresponding part for managing the part and storing at a position next to a slot managing a next part which is linked to a previous part, the recording method comprising the steps of:

determining whether a total number of slots for both a slot which manages an unrecorded part and slots of the predetermined number of slots which manage respective recorded parts is larger than the predetermined number of slots;

recording an item of information into a part set in the data storage area when the total number of slots is smaller than the predetermined number of slots;

storing start and end addresses of a part in which the item of information is recorded into an empty slot from the predetermined number of slots to form a managing slot; and storing a position of the managing slot in which the start and end addresses are stored.

7. A recording method for recording data on a storage medium having a rewrite enable table of contents that include a predetermined number of pointers and a predetermined number of slots, each of the pointers pointing to either a slot which manages an unrecorded part allocated within a data storage area in the storage medium or one of the predetermined number of slots which manages a recorded part allocated within the data storage area, each of the predetermined number of slots storing start and end addresses of a corresponding part for managing the part and each slot stored at a position next to a slot managing a next part which is linked to a previous part, the recording method comprising the steps of:

retrieving consecutive addresses by comparing start and end addresses of a recorded part, containing data which is commanded to be erased with respective end and start addresses of the unrecorded parts;

joining two parts at a boundary between the recorded part to be erased and any unrecorded part to form a new unrecorded part, one part to be joined being commanded to erase the recorded data, the other part to be joined containing one of retrieved consecutive addresses;

storing start and end addresses of the new unrecorded part into one of the two slots which had managed the two parts; and storing a position of the one slot having the start and end addresses of the new unrecorded part into a previous slot which managed an unrecorded part.

* * * * *